United States Patent Office 3,170,895
Patented Feb. 23, 1965

3,170,895
TRIAZINE POLYMERS AND METHOD OF MAKING SAME
Herbert K. Reimschuessel, Flanders, N.J., and Alan M. Lovelace, Dayton, Ohio, assignors to the United States of America as represented by the Secretary of the Air Force
No Drawing. Filed Aug. 23, 1962, Ser. No. 219,082
2 Claims. (Cl. 260—47)
(Granted under Title 35, U.S. Code (1952), sec. 266)

The invention described herein may be manufactured and used by or for the United States Government for governmental purposes without payment to us of any royalty thereon.

This invention relates to novel nitrogen-containing polymeric materials and to methods of preparing the same. More specifically, this invention concerns itself with a method for synthesizing polymeric materials which have valuable properties that make them particularly useful in molding, casting, laminating, and adhesive applications wherein such applications require the use of polymeric materials that are characterized by extreme thermal stability.

The polymeric materials of this invention are polyguanamines and consist essentially of intrachain units having the following structural formula:

(I)

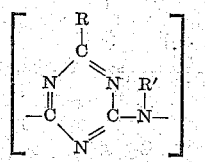

Where R represents a member of the class consisting of monovalent lower alkyl, aryl, dialkylamine and diarylamine radicals free of aliphatic unsaturation and of no more than 8 carbon atoms in the case of the alkyl radicals and no more than 12 carbon atoms in the case of the aryl radicals; and R' represents a member of the class consisting of hydrogen and monovalent lower alkyl radicals and aryl radicals free of aliphatic unsaturation and of no more than 8 carbon atoms in the case of the alkyl radicals and no more than 12 carbon atoms in the case of the aryl radicals.

Illustrative examples of the monovalent radicals represented by R and R' in the above formula are alkyl (e.g., methyl to octyl inclusive, and the various isomeric forms thereof); aryl (e.g., phenyl, biphenylyl, naphthyl, xenyl, etc.), including aliphatic substituted aryl (e.g., tolyl, xylyl, ethylphenyl, propylphenyl, etc.), and aryl substituted aryl (e.g., benzyl, phenylethyl, phenylpropyl, etc.); dialkylamine (e.g., dimethylamine, diethylamine, etc.) diarylamine (e.g., diphenylamine, etc.) including mixed aliphatic-aromatic diamines (e.g., methylphenylamine, ethylphenylamine, etc.).

It is the primary object of this invention to provide a new class of condensation polymers and a process for preparing the same. Another object of this invention is to provide new polymeric materials which have particular utility in molding, casting, laminating, and adhesive applications. Still another object of this invention is to provide novel polymeric materials which are characterized by high thermal stability.

In accordance with this invention, it has been found that aminotriazines carrying at least one hydrogen atom on the amino group react with compounds having a phenoxy group in order to form substituted guanamines with the liberation of phenol. Consequently, the objects of this invention are accomplished by effecting under heat a polycondensation reaction between a diaminotriazine and a diphenoxytriazine. Alternatively, the polymeric materials of this invention can be produced by effecting under heat the autocondensation of a 2-amino-4-phenoxytriazine. The polycondensation reactions of this invention may be carried out either in an inert organic solvent such as high boiling paraffin oil or diphenyl. However, the reaction can also be carried out satisfactorily without the use of a solvent. The components which are to be polymerized are placed in a suitable reaction container, and the polycondensation reaction is effected under heat at temperatures between about 150° to 300° C. Preferably, the reaction is carried out in an inert atmosphere such as nitrogen with or without the application of diminished pressures. The time of the reaction depends to a great deal on the particular reactants employed. Generally, however, the reaction is completed within a period of time from about one to 10 hours. The reaction mixture is then suitably worked up, and the resultant polymeric material is purified by extraction with an appropriate solvent such as acetone or ethanol.

The general reactions involved in the preparation of the guanamine polymers of the kind embraced in Formula I may be illustrated by the following equations in which Formula II shows the condensation of a diaminotriazine with a diphenoxytriazine, while Formula III discloses the autocondensation of a 2-amino-4-phenoxytriazine.

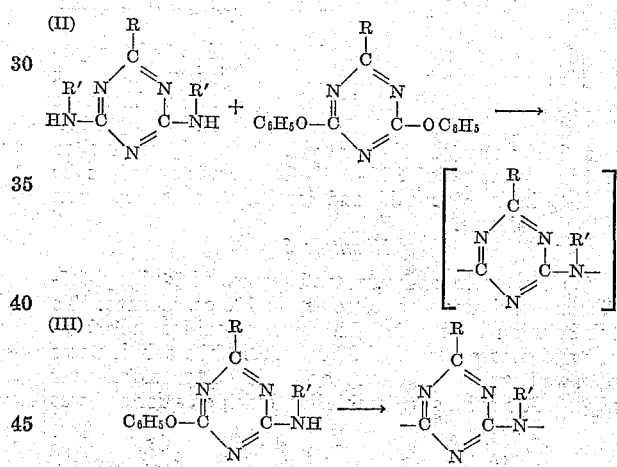

In the above equations R and R' have the same meanings as given above with reference to Formula I. The preferred polymers from a standpoint of thermal stability and convenience of reaction are those of the above structure where R is a methyl or phenyl radical, and R' is hydrogen or a methyl or phenyl radical.

The novel features which are believed to be characteristic of the invention are set forth in the appended claims. However, the invention will be best understood by reference to the following examples. These examples, which depict specific embodiments of the invention are presented for the purpose of illustration only, and are not to be construed as limiting the scope of the invention in any way.

*Example 1*

(a) Forty-seven and five hundredths gram of phenol and 53.4 g. of dichlorophenyl triazine were melted together, heated for 5 to 6 hours at 200° C. After cooling, the mixture was treated with ligroin and then recrystallized from methanol, M.P. 110° C.

(b) Two grams of 2-phenyl-4,6-diphenoxy-s-triazine, synthesized as described above and 1.1 grams of benzoguanamine were mixed in an 8 in. heavy walled Pyrex test tube fitted with an air reflux condenser. The tube was heated at 250° C. for 8 hours. At the end of that period it was extracted in a Soxhlet extractor with ether. The polymer obtained by this procedure melted in the range of 330–350° C. and was soluble in chloroform and sulfuric acid and insoluble in 1,4-butanediol, ethylene glycol, benzene and acetic acid.

Example 2

(a) Six gms. of 29 percent $NH_4OH$ solution were slowly added to an acetone solution of 22.6 gms. of 2-phenyl-4,6-dichloro-s-triazine in a three necked flask fitted with a stirrer, condenser and dropping funnel. During the $NH_4OH$ addition the flask was cooled with an ice bath. Upon completion of the addition the reaction was allowed to proceed at room temperature. After one hour the insoluble $NH_4Cl$ which had formed was filtered off and the volume of the remaining solution reduced. The desired 2-phenyl-4-amino-6-chloro-s-triazine was recovered from this solution and recrystallized from chloroform M.P. 213–215° C.

(b) A water solution of 2.9 gms. of phenol and 1.4 gms. of sodium hydroxide was aded to 7.1 gms. of 2-phenyl-4-amino-6-chloro-s-triazine dissolved in dioxane and the mixture refluxed for 6 hours in a three necked flask fitted with a condenser, stirrer and dropping funnel. At the end of 6 hours the stirring was stopped and the mixture allowed to cool. The 2-phenyl-4-amino-6-phenoxy-s-triazine crystallized from the cool reaction mixture. Recrystallization of the product from isopropyl alcohol gave a M.P. 181–183° C. Analysis C: calc. 68.18 percent, found 68.12 percent; N: calc. 21.21 percent, found 21.54 percent; H: calc. 4.55 percent, found 4.48 percent.

(c) One gram of the 2-phenyl-4-amino-6-phenoxy-s-triazine was introduced into 2.6 in. thick walled Pyrex glass tube fitted with an air reflux condenser. The tube was then heated at 250° C. for 10 hours. The product was then extracted with ethanol. The polymer melted within the range of 346–368° C. It was found to be soluble in sulfuric acid and insoluble in the common organic solvents.

Example 3

(a) Forty-five and two tenths gms. of 2-phenyl-3,5-dichloro-s-triazine were dissolved in 100 cc. dioxane. To this solution were added 72.8 gms. of aniline in 100 cc. dioxane over a period of 30 minutes. The solution was then refluxed for 4 hours and allowed to stand over night. The aniline hydrochloride which was formed was then filtered off and ⅓ of the remaining liquid distilled off under water aspirator vacuum. The solid which precipitated was filtered, dried and recrystallized from chloroform M.P. 210–211° C.

(b) One and nine tenths gms. of 2-phenyl-4,6-dianiline-s-triazine were added to 2 gms. of 2-phenyl-4,6-diphenoxy-s-triazine in an 8 in. heavy walled Pyrex tube fitted with an air reflux condenser. The tube was heated at 250° C. for 10 hours. At the end of this period the product was washed with boiling water, dissolved in chloroform and the solution dried over night over $CaCl_2$. Evaporation of the chloroform gave a brown glassy material with a M.P. 60–72° C. It decomposed at 300–320° C. It was found to be soluble in dimethylformamide, acetic acid, chloroform, benzene and sulfuric acid.

It will be seen, therefore, that the instant invention provides novel nitrogen containing polymeric materials which are characterized by having an extremely high thermal stability. These new polymers are particularly useful in the production of molded articles. They may be employed alone or admixed with a filler, dye, or pigment. Among the fillers that may be employed are asbestos fibers, glass fibers, cotton flock, cloth cuttings, wood flour, mica dust, sand, clay, etc.

It will be understood by those skilled in the art to which the subject matter of the present invention pertains, that while the compositions and method disclosed herein illustrate preferred embodiments of the invention, modifications and alterations can be made without departing from the spirit and scope thereof, and that all such modifications as fall within the scope of the appended claims are intended to be included herein.

What is claimed is:

1. The method of preparing a nitrogen-containing polymer which comprises heating under reflux a mixture in substantially equimolar proportions of 2-phenyl-4,6-diphenoxy-s-triazine and 2-phenyl-4,6-dianiline-s-triazine at a temperature of about 250° C. for about 10 hours.

2. The product produced by the method of claim 1.

References Cited by the Examiner

Reimschuessel et al.: Journal of Polymer Science, vol. 40, pages 270–272, October 1959.

Thurston et al.: J.A.C.S., vol. 73, pages 2992–2996, July 1951.

WILLIAM H. SHORT, *Primary Examiner.*